No. 619,159. Patented Feb. 7, 1899.
C. FOSBY.
LATHE TOOL.
(Application filed Mar. 2, 1898.)
(No Model.)
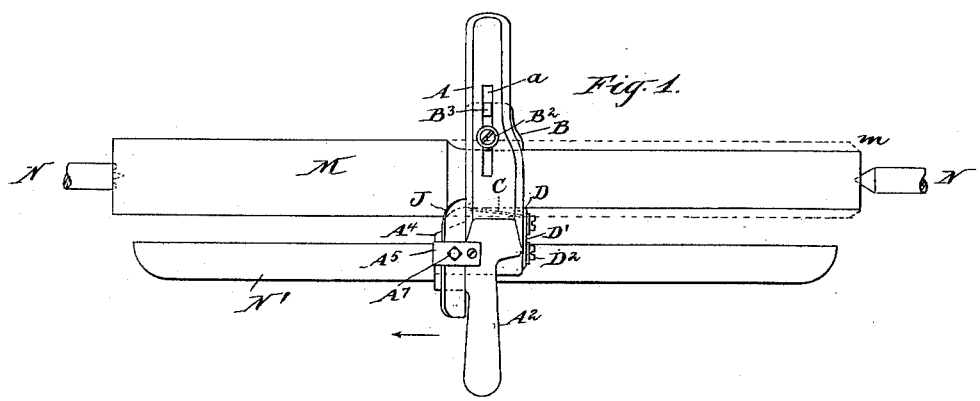
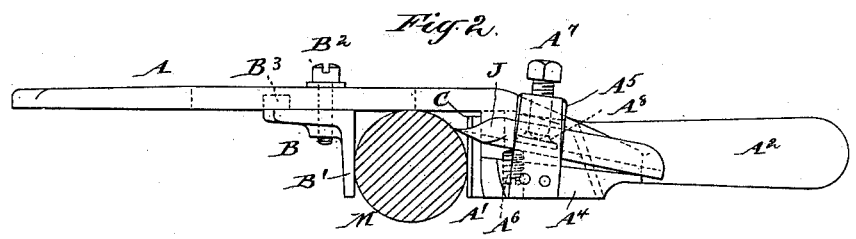
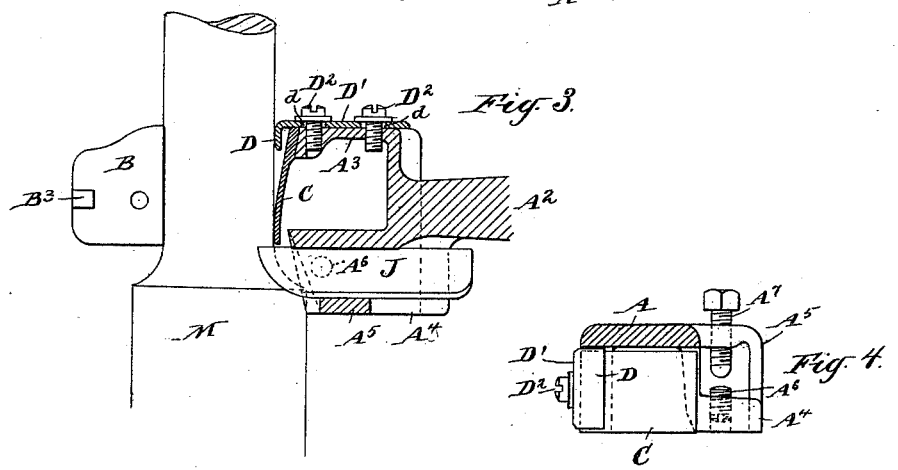
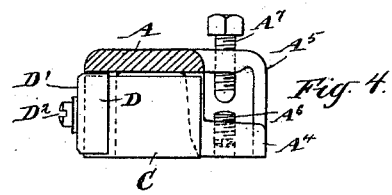
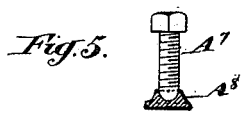
Witnesses
Inventor
Charles Fosby,
By his Attorney
Charles R. Searle.
THE NORRIS PETERS CO., PHOTO-LITHO., WASHINGTON, D. C.

UNITED STATES PATENT OFFICE.

CHARLES FOSBY, OF RUTHERFORD, NEW JERSEY.

LATHE-TOOL.

SPECIFICATION forming part of Letters Patent No. 619,159, dated February 7, 1899.

Application filed March 2, 1898. Serial No. 672,240. (No model.)

*To all whom it may concern:*

Be it known that I, CHARLES FOSBY, a citizen of the United States, residing in Rutherford, in the county of Bergen and State of New Jersey, have invented a certain new and useful Improvement in Lathe-Tools, of which the following is a specification.

The tool is intended to serve more especially in accurately forming cylindrical rods or spindles of wood having the same diameter throughout and requiring to be each exactly similar to the others.

Machines for making dowel-pins in long lengths, afterward cut to size as needed, have been long used and provide the material cheaply and uniformly; but in general millwork special orders frequently require a considerable number of true cylindrical spindles not sufficient to justify the construction or equipment of a special lathe on the dowel-machine principle.

The object of my invention is to provide a tool by which such work may be accurately and uniformly turned in an ordinary lathe without any special adjustment or change in the latter and with little labor or expense.

It consists of a bar having a yielding offset or shoulder on its under face and a corresponding gage, preferably adjustable, mounted on the same face, forming with the latter and the shoulder a rectangular notch or opening of a size to receive and contact with three sides or points in the circumference of a spindle, and a knife or cutting gouge mounted on the bar in advance of the opening, which reduces the rapidly-revolving material to the proper diameter as the tool is traversed axially thereof, the portion thus finished matching to the opening and serving as a guide for the further advance.

The invention also consists in certain details of construction and arrangement of parts to be hereinafter described.

The tool is easily handled and adjusted, is simple in construction, and not expensive to manufacture. The work produced is exceptionally accurate and is rapidly performed.

The accompanying drawings form a part of this specification and represent what I consider the best means of carrying out the invention.

Figure 1 is a plan view showing the tool in operation upon a spindle mounted between the centers of a lathe. The remaining figures are on a larger scale. Fig. 2 is a side view of the tool alone. Fig. 3 is a plan view, partly in horizontal section, with certain portions removed. Fig. 4 is a transverse section, partly in elevation. Fig. 5 is a sectional view showing a detail.

Similar letters of reference indicate the same parts in all the figures.

A is the thin main portion or body of the bar of cast-iron or other suitable material. It is plane on the under face and is provided near one end with a shoulder or offset $A'$, from which the handle $A^2$ projects parallel therewith. The angles at the opposite end of the bar are rounded off to adapt it also to be grasped by the hand. A longitudinal slot $a$ is produced in the bar, through which passes a screw $B^2$, tapped into a gage B, lying against the under face and having a depending lip $B'$, projecting down about equal to the shoulder $A'$ and held at any desired distance from the latter by adjusting its position and holding it in place by tightening the screw. A rectangular lug $B^3$, formed on the upper face of the gage, matches to the slot and serves with the screw in preserving the alinement of the gage and insuring that the lip $B'$ shall lie at a right angle transversely to the bar.

The thickened portion adjacent to the shoulder $A'$ is hollow and open from below, and to the front edge of one of the walls $A^3$ thus formed is secured one end of a steel plate C, serving as a stiff spring standing vertically parallel with the face of the gage-lip $B'$ and extending obliquely into the rectangular opening between the latter and the shoulder $A'$, the free end reaching nearly across the full width of the bar at that point. Its fixed end is partly covered or inclosed by the flange or stop D, formed by bending inward at a right angle a plate $D'$, secured to the outside of the wall $A^3$ by screws $D^2$, extending through slots $d$ in the plate into holes drilled and tapped in the wall to receive them. The slots and screws allow a limited adjustment of the stop D and permit the distance to which it shall extend into the opening to be accurately determined. On the opposite wall is a platform or ledge $A^4$, extending outward from the bar, the under face flush with the adjacent portion of the latter and the upper face inclined rearwardly. The forward edge is outwardly inclined and beveled, as shown. Near the front is an arch or yoke $A^5$, which may be formed in one with the bar or otherwise, as preferred, extending upwardly from the platform and reaching over to and joining the body near the junction with the handle $A^2$. This platform serves to support a knife or gouge J of suitable shape. I have shown it as L-shaped in cross-section, with the sharpened front end showing in plan view as a quarter-circle. It is held at the desired angle and forward projection by the screws $A^6 A^7$, the former a short screw extending upward from the platform with its head concealed therein and the latter driven downward through the yoke $A^5$. The points of both screws are rounded to insure fair contact with the knife, and the screw $A^7$ is received in a shoe $A^8$, having a hemispherical cavity in its upper face, the lower face being plane and lying against the knife. The screw $A^7$ stands in rear of the screw $A^6$, so that its pressure is exerted at a point between the latter and the rear end of the platform, as shown, thus holding the knife very firmly and reliably against displacement in either direction.

The manner of using the tool is illustrated in Fig. 1, in which a billet of wood M, having a square cross-section or with the angles roughly turned off, is held between the centers N N of an ordinary lathe. The corner at $m$ has been also taken off. The knife is first set at the proper angle and projection relatively to the notch to produce a cut which will reduce the billet to the required size. This must be determined by experiment and judgment, and the facility with which the desired setting is attained will depend on the skill and experience of the operator. The tool is then grasped in both hands, one on the handle and the other on the bar A, and applied at the tapered end of the rapidly-revolving billet, a portion of which will enter the rectangular opening until arrested by the contact of the spring. The thrust being continued, the spring will be forced back, and at the same time the knife will begin to take a chip and reduce the end of the rough billet to the diameter for which the knife is set. The gage B B' is then moved until its face lies in contact with the finished surface of the spindle, and the tool is then traversed in the direction indicated by the arrow, with its thickened portion sliding upon the rest N', until the knife runs off at the opposite end of the billet, which is thus reduced and finished to a uniform diameter throughout. As soon as the length of the finished portion equals the width of the bar A the stop D finds a bearing against the wood and aids in holding the tool at a true right angle to the work as the cut progresses. It will be seen in Fig. 4 that the gage offers considerable bearing-surface on one face of the finished work while the stop D is in contact on the other at one side of the tool and, with the spring C, affords a corresponding long bearing on that face also, so that the operator has little difficulty in traversing the tool in exact parallelism with the axial line, even though the billet be so slender as to curve slightly therefrom in either direction during the operation. Any number of spindles of the same size may be turned without resetting. The under face of the bar is also in contact with the finished work, (see Fig. 2,) resulting in a complete guidance of the tool by the previously-finished portion, while the knife J is operating in advance and reducing the billet to the corresponding diameter, conditioning it to in turn serve in the guiding.

The cutting edge of the knife is preferably formed as shown to remove a deep chip, and thus avoid the necessity of previously shaping the billet; but the latter may, if preferred, be roughly turned to approximately the right diameter and be finished by the use of a knife differently shaped.

The force with which the spring C shall bear against the work is determined by the position of the stop D, which is for that reason adjustable. If it be set nearer the lip B', the spring will require less deflection in being forced upon the work, and consequently exert less pressure than it will when the stop is set nearer the spring. The yielding pressure thus maintained holds the tool in close contact with the finished portion of the work on two sides, and it is only necessary for the operator to hold the tool down against the upper side and draw it along in contact with the rest N'.

The tool is particularly serviceable in mills or shops where general miscellaneous orders are executed. By its use any number of cylindrical spindles may be quickly turned without special machinery, all uniform in diameter each with the other and of the same diameter throughout the length of each.

The usual process of gradually turning down and calipering as the work progresses is necessarily slow and inherently subject to error, the degree of perfection depending upon the skill of the workmen. With my invention the work can be done with rapidity and certainty, even by unskilled hands. Its adjustability enables it to include a wide range of sizes determined by the depth of the opening and the setting of the knife.

Modifications may be made in the forms and proportions without departing from the invention or sacrificing its advantages. The stop D may be omitted or so set as to be out of contact with the finished work, depending on the gage and spring alone to hold the tool in proper relation to the billet. Other forms of knives may be used and other means for holding them substituted.

Although I have described the invention as applied to woodworking, it will be understood that with a suitable cutting-tool it will serve successfully in working harder materials, as brass and soft iron; but the chip will be necessarily small, and such use will require several traverses with a new adjustment of the cutter for each.

I claim—

1. The lathe-tool described, consisting of a bar, a lip thereon, and a yielding shoulder, forming an opening adapted to receive and partially inclose the finished work, in combination with a knife carried by the bar in advance of said opening, whereby the finished work serves as a guide for and determines the advance cut, all substantially as and for the purposes herein specified.

2. In a lathe-tool, a bar, an adjustable gage thereon, and a yielding shoulder, forming a rectangular opening adapted to receive the finished work and contact on three faces thereof, in combination with a knife mounted adjustably on said bar at one side and in advance of said opening, all substantially as and for the purposes herein specified.

3. In a lathe-tool, a bar, an adjustable gage thereon, and a yielding shoulder, forming a rectangular opening adapted to receive the finished work and contact on three faces thereof, in combination with a knife mounted adjustably on said bar at one side and in advance of said opening, and a stop serving with said yielding shoulder, all substantially as and for the purposes herein specified.

4. The bar A, adjustable gage B, B' thereon, spring C and adjustable stop D, ledge $A^4$, yoke $A^5$, knife J and adjusting and holding screws $A^6$ $A^7$ therefor, all combined and arranged to serve substantially as and for the purposes herein specified.

5. The bar A having the slot $a$ and handle $A^2$, adjustable gage B, B' and lug $B^3$ thereon and holding-screw $B^2$ therefor, spring C and adjustable stop D, ledge $A^4$ and its yoke $A^5$, the knife J supported adjustably on said ledge, and the screws $A^6$ and $A^7$ for holding said knife, all combined and arranged to serve substantially as and for the purposes herein specified.

In testimony that I claim the invention above set forth I affix my signature in presence of two witnesses.

CHARLES FOSBY.

Witnesses:
WM. H. STEVENS, Jr.,
C. R. SOLEY.